US006757284B1

(12) United States Patent
Galles

(10) Patent No.: US 6,757,284 B1
(45) Date of Patent: Jun. 29, 2004

(54) METHOD AND APPARATUS FOR PIPELINE SORTING OF ORDERED STREAMS OF DATA ITEMS

(75) Inventor: Michael G. Galles, Los Altos, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/520,637

(22) Filed: Mar. 7, 2000

(51) Int. Cl.⁷ ............................................... H04L 12/56
(52) U.S. Cl. ..................................................... 370/394
(58) Field of Search ................................ 370/389, 392, 370/394, 474, 516, 517, 518

(56) References Cited

U.S. PATENT DOCUMENTS

| | | | |
|---|---|---|---|
| 4,491,945 A | | 1/1985 | Turner |
| 4,494,230 A | | 1/1985 | Turner |
| 4,630,260 A | | 12/1986 | Toy et al. |
| 4,734,907 A | | 3/1988 | Turner |
| 4,748,620 A | * | 5/1988 | Adelmann et al. .......... 370/394 |
| 4,829,227 A | | 5/1989 | Turner |
| 4,849,968 A | | 7/1989 | Turner |
| 4,893,304 A | | 1/1990 | Giacopelli et al. |
| 4,894,823 A | * | 1/1990 | Adelmann et al. .......... 370/252 |
| 4,899,335 A | * | 2/1990 | Johnson et al. ............. 370/392 |
| 4,901,309 A | | 2/1990 | Turner |

(List continued on next page.)

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS–96–07, Washington University, St. Louis, MO, 20 pages.

Turner et al., "System Architecture Document for Gigabit Switching Technology," Aug. 27, 1998, Ver. 3.5, ARL–94–11, Washington University, St. Louis, MO, 110 pages.

*Primary Examiner*—Chi Pham
*Assistant Examiner*—Anh-Vu H Ly
(74) *Attorney, Agent, or Firm*—The Law Office of Kirk D. Williams

(57) ABSTRACT

According to the invention, resequencers are used to sort one or more sets of a plurality of streams of ordered data items. In certain implementations, these data items represent packets within a packet switch. Additionally, in some packet switch implementations, jitter buffers are distributed within a packet switch (e.g., at each switching stage) to reduce packet burstiness within the packet switch. Typically, a pipeline of sorting stages is used to order the one or more sets of streams of data items. Data items from the first set of streams is loaded into input registers or queues of the first stage. These data items are partitioned into groups which are each evaluated by a comparator with the winning entry (e.g., a smallest or largest value when being sorted in ordered value) placed in a second stage input queue. Each comparitor of the second stage evaluates the data items at its inputs and forwards its respective winning entry. In the case of more than one comparator in the second stage, then the winning entries are passed to a third stage, and so on. The sorting at each stage continues in parallel to efficiently produce a stream of ordered data items from the first set of streams of data items. Certain implementations use the same resources in a multiplexed fashion to sort a plurality of sets of streams of ordered data items. In certain implementations, after some event or predetermined number of clock ticks or sorted data items produced, then a second set of data items is loaded into input registers or queues of the first stage of the embodiment. This loading and multiplexing of sets of streams of data items continues for each of the sets. In this manner, implementations of the invention are able to more quickly and efficiently sort one or more sets of ordered streams of data items, such as packets within a packet switch.

18 Claims, 13 Drawing Sheets

U.S. PATENT DOCUMENTS

| | | | | |
|---|---|---|---|---|
| 5,127,000 A | * | 6/1992 | Henrion | 370/394 |
| 5,173,897 A | | 12/1992 | Schrodi et al. | |
| 5,179,551 A | | 1/1993 | Turner | |
| 5,179,556 A | | 1/1993 | Turner | |
| 5,216,420 A | * | 6/1993 | Munter | 340/14.1 |
| 5,220,664 A | * | 6/1993 | Lee | 707/7 |
| 5,229,991 A | | 7/1993 | Turner | |
| 5,253,251 A | * | 10/1993 | Aramaki | 370/394 |
| 5,260,935 A | | 11/1993 | Turner | |
| 5,274,642 A | * | 12/1993 | Widjaja et al. | 370/411 |
| 5,319,360 A | * | 6/1994 | Schrodi et al. | 370/394 |
| 5,337,308 A | | 8/1994 | Fan | |
| 5,339,311 A | | 8/1994 | Turner | |
| 5,402,415 A | | 3/1995 | Turner | |
| 5,402,417 A | * | 3/1995 | Aramaki | 370/392 |
| 5,406,556 A | * | 4/1995 | Widjaja et al. | 370/394 |
| 5,414,705 A | * | 5/1995 | Therasse et al. | 370/352 |
| 5,461,614 A | * | 10/1995 | Lindholm | 370/394 |
| 5,491,728 A | * | 2/1996 | Verhille et al. | 375/362 |
| 5,570,348 A | | 10/1996 | Holden | |
| 5,721,820 A | | 2/1998 | Abali et al. | |
| 5,822,317 A | * | 10/1998 | Shibata | 370/395.62 |
| 5,842,040 A | | 11/1998 | Hughes et al. | |
| 5,875,190 A | * | 2/1999 | Law | 370/395.42 |
| 6,055,246 A | * | 4/2000 | Jones | 370/503 |
| 6,246,684 B1 | * | 6/2001 | Chapman et al. | 370/394 |
| 6,252,891 B1 | * | 6/2001 | Perches | 370/503 |
| 6,330,559 B1 | * | 12/2001 | Azuma | 707/7 |
| 6,434,148 B1 | * | 8/2002 | Park | 370/394 |

* cited by examiner

METHOD AND APPARATUS FOR PIPELINE SORTING OF ORDERED STREAMS OF DATA ITEMS

FIELD OF THE INVENTION

This invention relates to pipeline sorting of ordered streams of data items, which may be used to sort timestamps of data items within a packet switching system, and to providing jitter buffers at various switching stages of a packet switch.

BACKGROUND OF THE INVENTION

The communications industry is rapidly changing to adjust to emerging technologies and ever increasing customer demand. This customer demand for new applications and increased performance of existing applications is driving communications network and system providers to employ systems having greater speed and capacity (i.e., greater bandwidth). In trying to achieve these goals, a common approach taken by many communications providers is to use packet switching technology. Packet technology typically allows a plurality of information types to be transmitted over the same transmission lines and using the same packet switching systems and devices.

As used herein, the term "packet" is used to indicate generically addressable information packets of all types, including fixed length cells and variable length packets. Moreover, the information contained in such packets could represent one or more of an unlimited type of information, including voice, data, video, and audio information. Furthermore, the term "system" is used generically herein to describe one or more systems, networks, computer or communication devices or mechanisms, or combinations thereof.

Consumers and designers of these systems typically desire increased performance at a reasonable price. A commonly used technique for helping to achieve this goal is for these systems to provide multiple paths between a source and a destination. Packets of information are then dynamically routed and distributed among these multiple paths. It is typically more cost-effective to provide multiple slower rate links or switching paths, than to provide a single higher rate path. Such designs also achieve other desired performance characteristics.

An artifact of using dynamic routing is the need to resequence each of the streams of packets dynamically routed through a packet switch to an output port respectively back into their original order. Moreover, improved methods and systems for sequencing and resequencing of data items in this and other communications and computing environments are needed. Some packet switches manipulate an actual packet of information (including payload), while other packet switches manipulate a data item representing a packet rather than the whole packet for certain operations. The invention covers these and other variants of packet switch implementations.

Merge sorting, illustrated in FIG. 1, is a known technique for producing a single sorted list from multiple ordered lists whose values are known a priori. For example, two lists 920 and 922 of known elements sorted in ascending order can be combined into a single sorted list 924 by repeatedly taking the smaller value from the top of lists 920 and 922 and appending the smaller value to the end of list 924. This example can be extended to a set of known n values, which can be sorted by first dividing the set into n lists containing a single value each, then combining pairs of lists to produce n/2 lists with two values each. Pairs of these lists are then merged, producing n/4 lists with four values each. Continuing in this fashion eventually yields a single sorted list containing the original values, but in sorted order, as shown in FIG. 1. Merge sorting can also be implemented using three-way merging (that is, merging three sorted lists into a single sorted list in one step) for three lists of known items, rather than by using two-way merging. More generally, d-way merging is possible for any integer d>1 for sorting d sorted lists of known values.

However, known sorting techniques are not candidates for resequencing streams of packets in a packet switching environment. In such a dynamic environment, lists of known values are not available. In dynamic resequencing systems, a complete set of packets to be resequenced is routinely not available at the time resequencing decisions must be made. Furthermore, the resequencing process is additionally complicated because the streams of packets to be resequenced can be temporarily empty.

New methods, apparatus, and systems for sequencing and resequencing information in a dynamic environment are needed, including those which perform resequencing dynamically routed packets in a packet switch.

Additionally, because of congestion within a packet switch dynamically routing packets, the time required for a packet to traverse the packet switch will vary substantially, which is sometime referred to as packet "burstiness" within the packet switch. When packets of an ordered packet stream arrive at an output interface before previous packets of the stream, these early arriving packets must be held in buffers until the previous packets arrive. Typically, a significant number of buffers must be placed in the output interfaces of a packet switch to hold these packets. Needed are new methods, apparatus, and systems for reducing the burstiness of packet traffic within a packet switch.

SUMMARY OF THE INVENTION

A method is disclosed for producing a single ordered stream of data items. An embodiment partitions the ordered streams of data items into a plurality of groups. Then, the processes of determining a first group data item for each of the plurality of groups to produce a plurality of first group data items, and determining a first system data item from the plurality of the first group data items are repetitively performed to produce the single ordered stream of data items.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
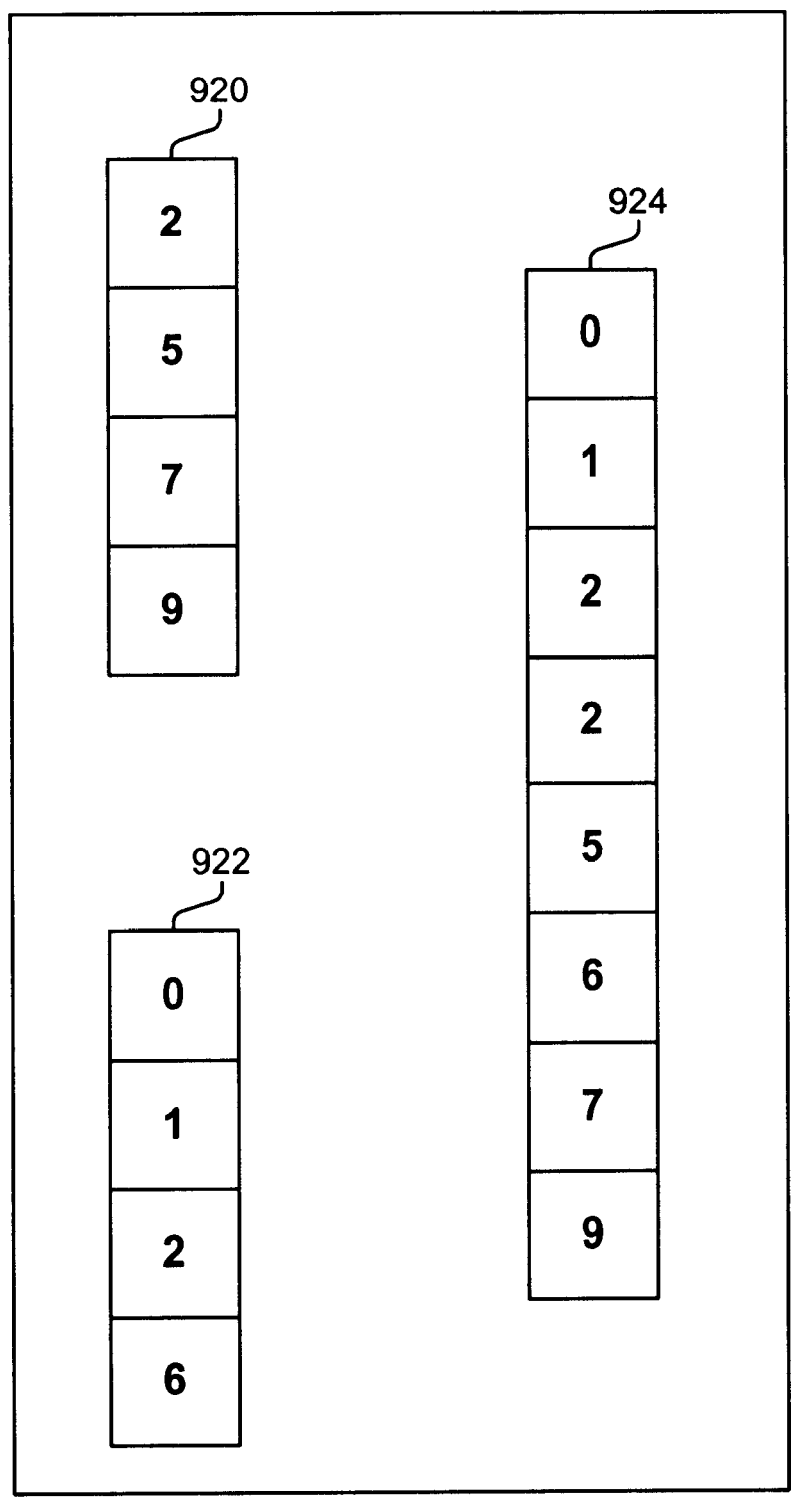
FIG. 1 is a schematic representation of a prior art merge sort.

According to the invention, methods and apparatus are disclosed for sorting or ordering one or more sets comprising multiple streams of ordered data items into a single stream of data items, which could be used in resequencing packets in a packet switching system. Additionally, methods and apparatus are disclosed for reducing packet burstiness within a packet switch. Embodiments described herein include various elements and limitations, with no one element or limitation contemplated as being a critical element or limitation. Each of the claims individually recite an aspect of the invention in its entirety. Moreover, embodiments of the invention include, inter alia, systems, integrated circuit chips, methods, and computer-readable medium containing instructions. The embodiments described hereinafter embody various aspects and configurations within the scope and spirit of the invention. Note, the term "resequencing" and variants thereof are used herein to describe ordering/sorting one or more data streams or elements which may have or may not have been previous placed in order or derived from a prior sequence of one or more data streams or elements.

Methods and apparatus are described herein for efficiently sorting streams of one or more data items. The types of data items are extensible, and can include packets, especially when the embodiment of the invention is used in a packet switching system. Certain packet switching systems, especially those using dynamic routing, need to resequence packets coming from multiple switching elements or networks destined for a common output. These packets typically include a time-stamp or sequence value on which the resequencing process can be based.

Some of the embodiments described herein are in the form of a packet switch for routing packets having a time-stamp or sequence number. These embodiments reduce the packet burstiness through the packet switch by using multiple jitter buffers (or components and variants thereof) distributed within the packet switch. For example, in one embodiment a jitter buffer is used at each switching stage. Other embodiments distribute jitter buffers among components or locations within the packet switch (e.g., only among selected switching stages, at one or more switching stages and in an output interface).

Moreover, techniques and operations described herein may be implemented in software, hardware, firmware and other implementation technologies. An implementation may also be tailored to match the technology used and the timing requirements of the system. For example, some embodiments described herein use four-to-one comparators on data items to be ordered based on the values of a comparison field of twenty-eight bits (e.g., a 28-bit time-stamp), when the comparator needs to compare the comparison fields of the data items in a very small time window. Other embodiments might use eight-to-one comparators when the comparison fields are smaller, the time window is larger, or faster implementation technology is used. Also, embodiments might vary the size of, or remove certain queues; or implement the embodiment using technologies other than those described herein while remaining within the scope and spirit of the invention.

Certain embodiments described herein use a pipeline approach to sorting one or more sets of streams of data items. In one embodiment, data items from the first set of streams are loaded into input registers or queues (of length one or more) of a first stage of a sequencer/resequencer. These data items are partitioned into groups which are each evaluated by a comparator with the winning entry (e.g., a smallest or largest value when being sorted in ordered value) placed in a second stage input queue (of length one or more). Each comparator of a second stage evaluates the data items at its inputs and forwards its respective winning entry. In the case of more than one comparator in the second stage, the winning entries are passed to a third stage, and so on. In one embodiment, comparators with different numbers of inputs are used. However, if all comparators have n inputs and there is a total of m streams of data items, then the number of stages is the ceiling of $\log_n m$.

The sorting at each stage continues in parallel as to efficiently produce a stream of ordered data items from the first set of streams of data items. In one embodiment that orders a single set of data items, the process is typically continuous and can depend on the arrival rate of the data items. In other embodiments, the same resources are used in a multiplexed fashion to sort multiple sets of streams of ordered data items. In such an embodiment, after some event or predetermined number of clock ticks or sorted data items produced, a second set of data items is loaded into input registers or queues (of length one or more) of the first stage of the sequencer/resequencer. This loading and multiplexing of sets of streams of data items continues for each of the sets. In some embodiments, the data items from a previous set are flushed from the sorting stages of the system. In other embodiments, the sorting system continue to sort a previous set in the later stages of the sorting system while a new set proceeds through the earlier stages of the sorting system, with the remaining data items from the previous set typically being flushed a later point in time. Data items that are flushed from the sorting stages will be processed in a later cycle. One embodiment leaves the a copy of each data item in an input memory or queue until the data item is produced as part of the ordered stream of data items. Sorting multiple sets of streams of ordered data items is especially useful in a packet switching system when there are multiple classes or priorities of data items and useful for sorting the data items destined for multiple internal or external destinations.

Embodiments described herein also accommodate different semantics of the data items being sorted. For example, in a packet switch, some input streams to the packet resequencer might become empty for a time period. The packet resequencer might continue to process data items at some of its stages, until a data item is received. One such data item might be a floor message (instead of an actual data packet being routed through the packet switch) which identifies a floor value which no subsequent packets from this stream will have a sorting value less than. Also, a packet switch might forward an actual packet before a floor message when each have a same sorting value.

FIGS. 2A–E and their discussion herein are intended to provide a description of various exemplary packet switches, computing systems, and general environments in which techniques described herein can be practiced. Various methods, apparatus, systems, and other implementation forms are provided for sorting multiple streams of ordered data items into a single stream of data items, which could be used in resequencing packets in a packet switching system. However, the techniques and processes described herein are not limited to a single packet switch, switching system, or computing environment. Rather, the architecture and functionality as taught herein and would be understood by one skilled in the art is extensible to an unlimited number of packet switches, systems and other embodiments in keeping with the scope and spirit of the invention.

Figure 2A:
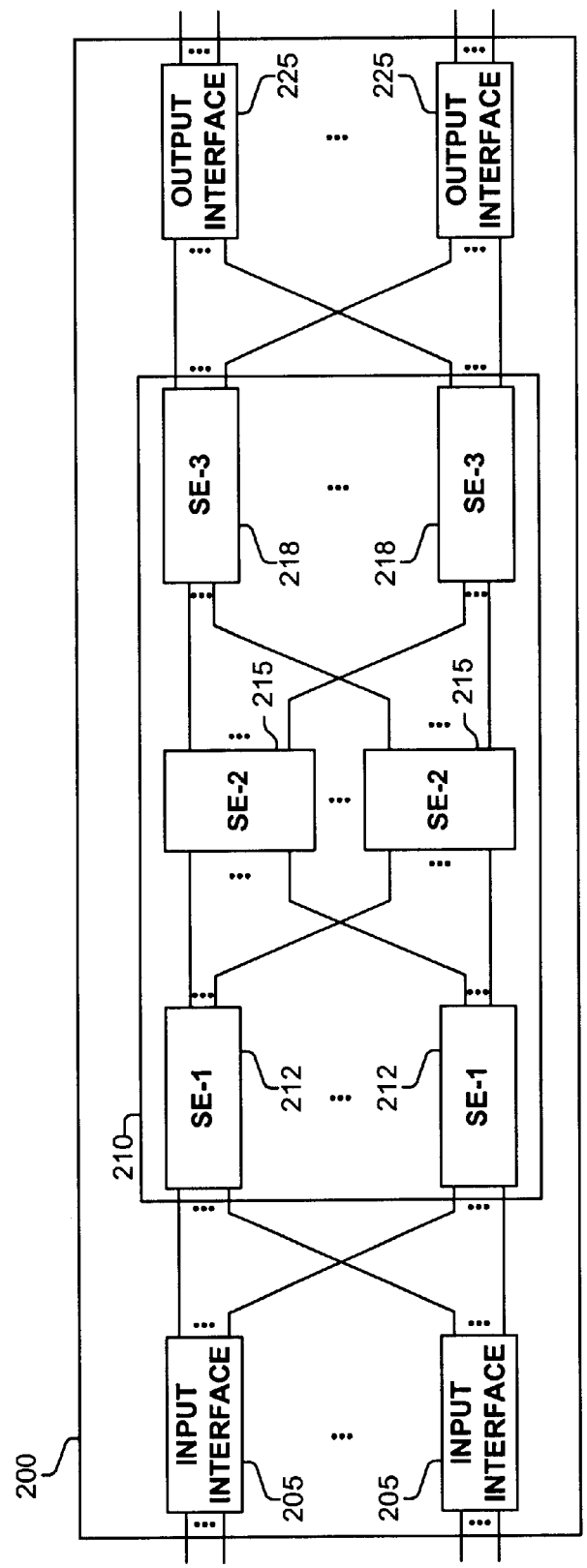
FIGS. 2A–E are block diagrams of a few of many possible operating environments.
Figure 2B:
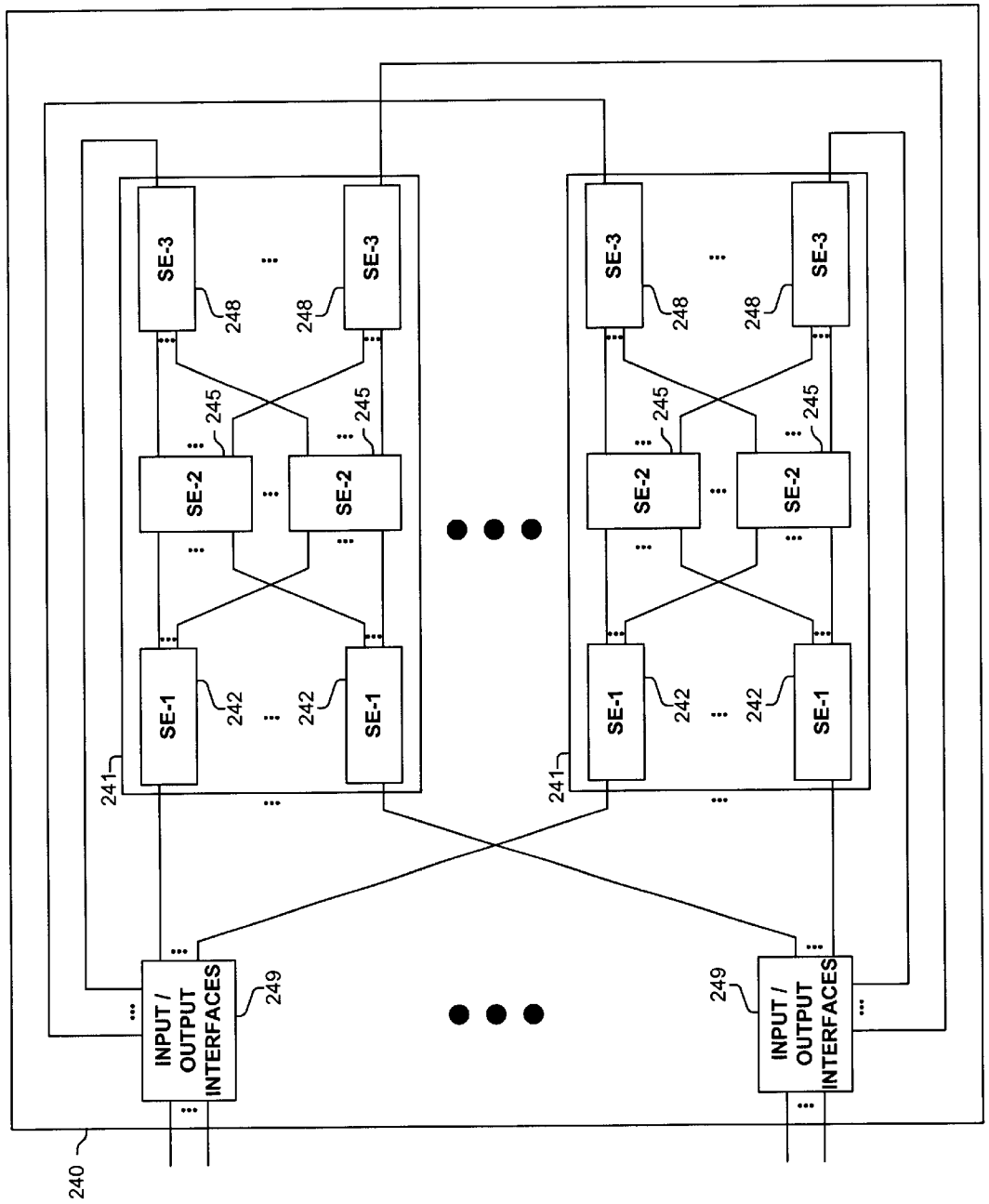
Figure 2C:
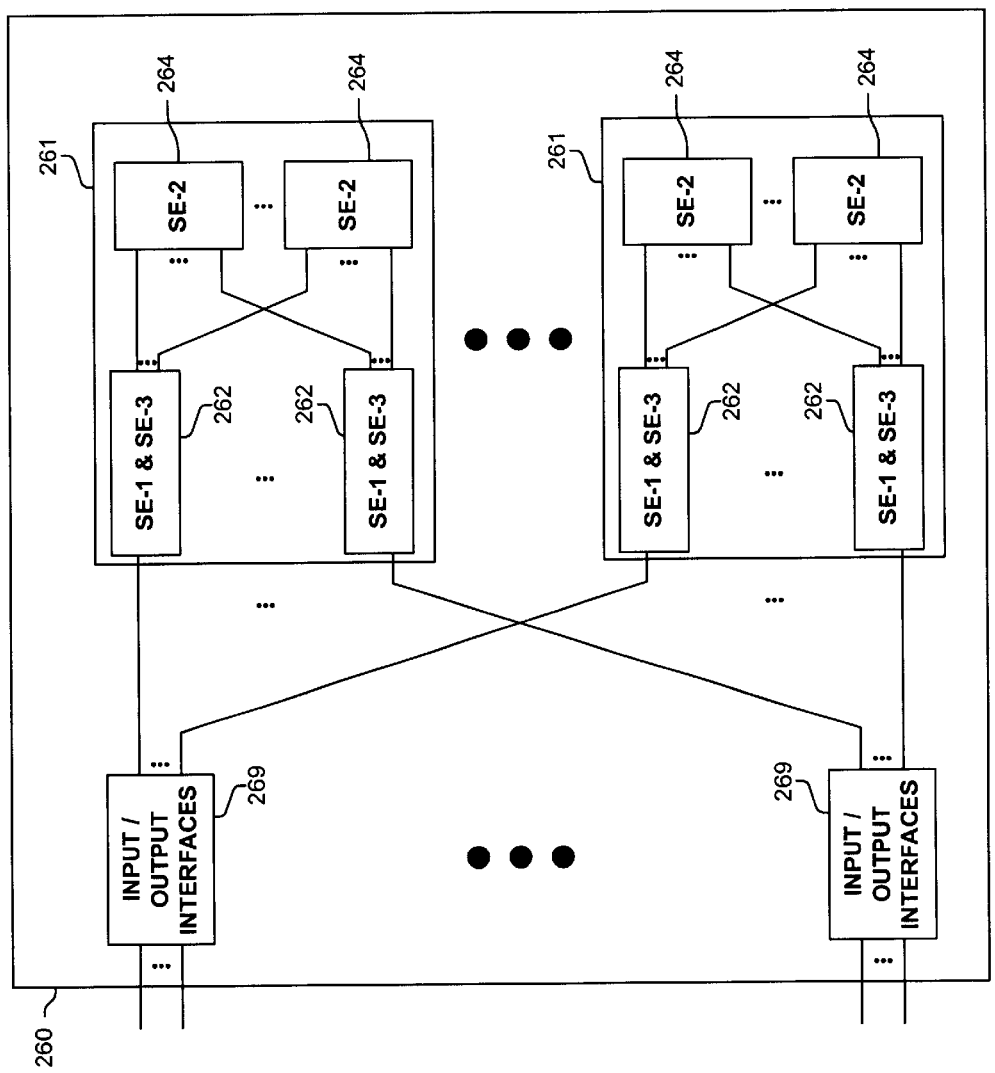

FIGS. 2A–C illustrate different exemplary packet switching systems. FIG. 2A illustrates an exemplary packet switch 200 having inputs and outputs and a single interconnection network 210. FIG. 2B illustrates an exemplary packet switch 240 having interconnection networks 241 and common input and output interfaces 249. FIG. 1C illustrates an exemplary folded packet switch 260 having multiple interconnection networks 261 and common input and output interfaces 269. Each of these packet switches 200, 240 and 260 resequence packets in a manner disclosed herein.

FIG. 2A illustrates an exemplary embodiment of a packet switch 200. Packet switch 200 comprises input interfaces 205, which are interconnected over multiple links to an interconnection networks 210, which are interconnected over multiple links to output interfaces 225. Interconnection networks 210 as shown comprise multiple switch elements SE-1 212, SE-2 215, and SE-3 218 also interconnected by multiple links. Typically, the input and output interfaces 205 and 225 connect to other systems (not shown) which provide the data items to be routed and resequenced by the packet switch 200. The resequencing of data items (or packets) may occur at one or more of the input interfaces 205, switch elements SE-1 212, SE-2 215, and SE-3 218, output interfaces 225, and/or other locations within packet switch 200.

FIG. 2B illustrates another exemplary operating environment and embodiment of a packet switch 240. Packet switch 240 comprises input and output interfaces 249 interconnected over multiple links to interconnection networks 241, which are interconnected over multiple links returning to input and output interfaces 249. Interconnection networks 241 as shown comprise multiple switch elements SE-1 242, SE-2 245, and SE-3 248 also interconnected by multiple links. Typically, interfaces 249 connect via bi-directional links to other systems (not shown) which provide the data items to be routed and resequenced by the packet switch 240. The resequencing of data items (or packets) may occur at one or more of the input and output interfaces 249, switch elements SE-1 242, SE-2 245, and SE-3 248, and/or other locations within packet switch 240.

FIG. 2C illustrates another exemplary operating environment and embodiment of a packet switch 260. As shown, packet switch 260 has a folded network topology. Packet switch 260 comprises input and output interfaces 269 interconnected over multiple links to interconnection networks 261, which are interconnected over multiple links returning to interfaces 269. Interconnection networks 261 as shown comprise multiple switch elements SE-1 & SE-3 262 and SE-2 264 also interconnected by multiple links. Typically, interfaces 269 connect via bi-directional links to other systems (not shown) which provide the data items to be routed and resequenced by the packet switch 260. The resequencing of data items (or packets) may occur at one or more of the input and output interfaces 269, switch elements SE-1 & SE-3 262 and SE-2 264, and/or other locations within a packet switch 260.

Figure 2D:
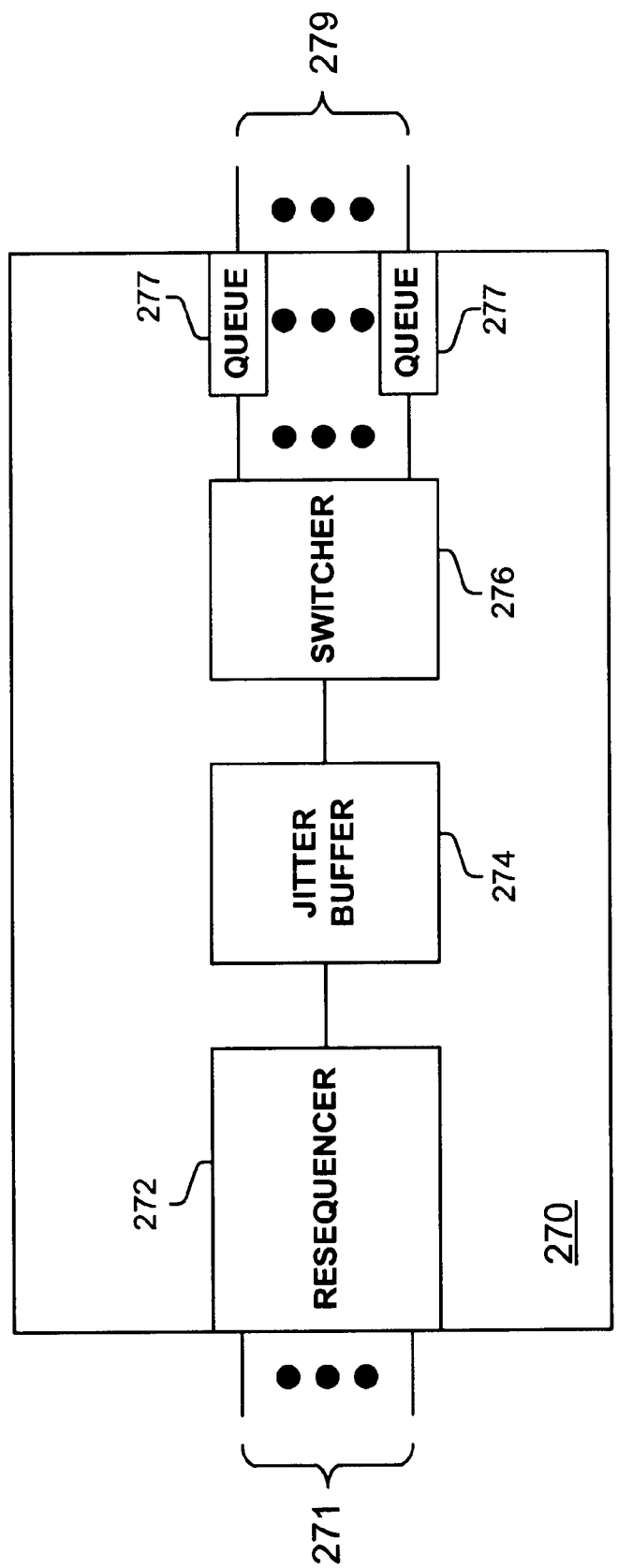

An example of an embodiment of a packet resequencer and jitter buffer which can be used within packet switches 200, 240 and 260 (FIGS. 2A–C) or as a standalone packet switch is shown in FIG. 2D, to which we now turn. FIG. 2D illustrates an embodiment 270 for resequencing a stream of data items or packets received on the multiple input ports 271. Resequencer 272 sorts the incoming multiple of streams of data items into a single ordered stream which is forwarded through optional jitter buffer 274 to switcher 276 to the appropriate one or more of the multiple output queues 277 (having a length of one or more, or alternatively being links without any storage capability). Jitter buffer 274 is used to reduce the traffic burstiness through a packet switch by buffering packets which have not been in the packet switch a predetermined threshold amount of time. Switcher 276 could be a multiplexer, switching matrix, switching fabric, or the like. In a packet switching environment, the routing decision made by switcher 276 is typically based on information contained within the packet being routed (e.g., a destination field). These data items stored in output queues 277 are forwarded to other systems or elements of a packet switch (not shown in FIG. 2D) through output ports 279. Detailed descriptions of the operation of a few embodiments of resequencer 272 are explained hereinafter in relation to FIGS. 3A–B, 4A–B, 5 and 6. Detailed descriptions of the operation of a few embodiments of jitter buffer 274 are explained hereinafter in relation to FIGS. 7A–B.

Figure 2E:
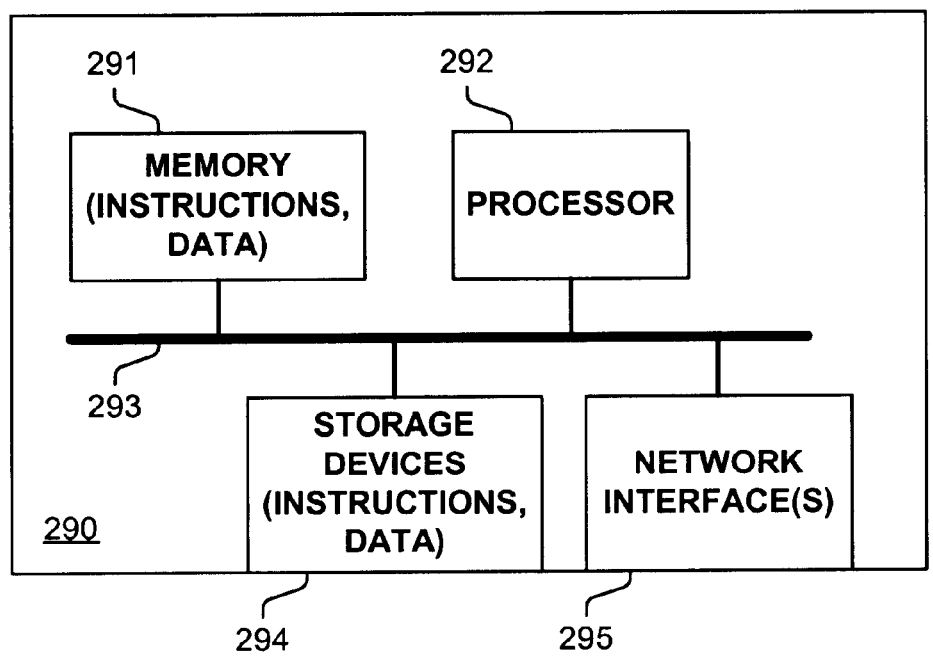

Before the discussion of these figures, FIG. 2E illustrates another embodiment and operating environment for practicing the invention. System 290 typically comprises a standard computer platform, a specialized computer or communications platform, including, but not limited to a desktop computer, a laptop computer, personal data assistant, a handheld computer, or a router. In an embodiment, system 290 comprises a processor 292, memory 291, storage devices 294, and optional network interface(s) 295, which are coupled via bus 293. Memory 291 is one type of computer-readable medium, and typically comprises random access memory (RAM), read only memory (ROM), integrated circuits, and/or other memory components. Memory 291 typically stores computer-executable instructions to be executed by processor 292 and/or data which is manipulated by processor 292 for implementing functionality in accordance with the invention. Storage devices 294 are another type of computer-readable medium, and typically comprise disk drives, diskettes, networked services, tape drives, and other storage devices. Storage devices 294 typically store computer-executable instructions to be executed by processor 292 and/or data which is manipulated by processor 292 for implementing functionality in accordance with the invention. Embodiment 290 sorts streams of data items stored in memory 291, storage devices 294, and/or received via network interface(s) 295.

As used herein, computer-readable medium is not limited to memory and storage devices, rather, computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 3A:
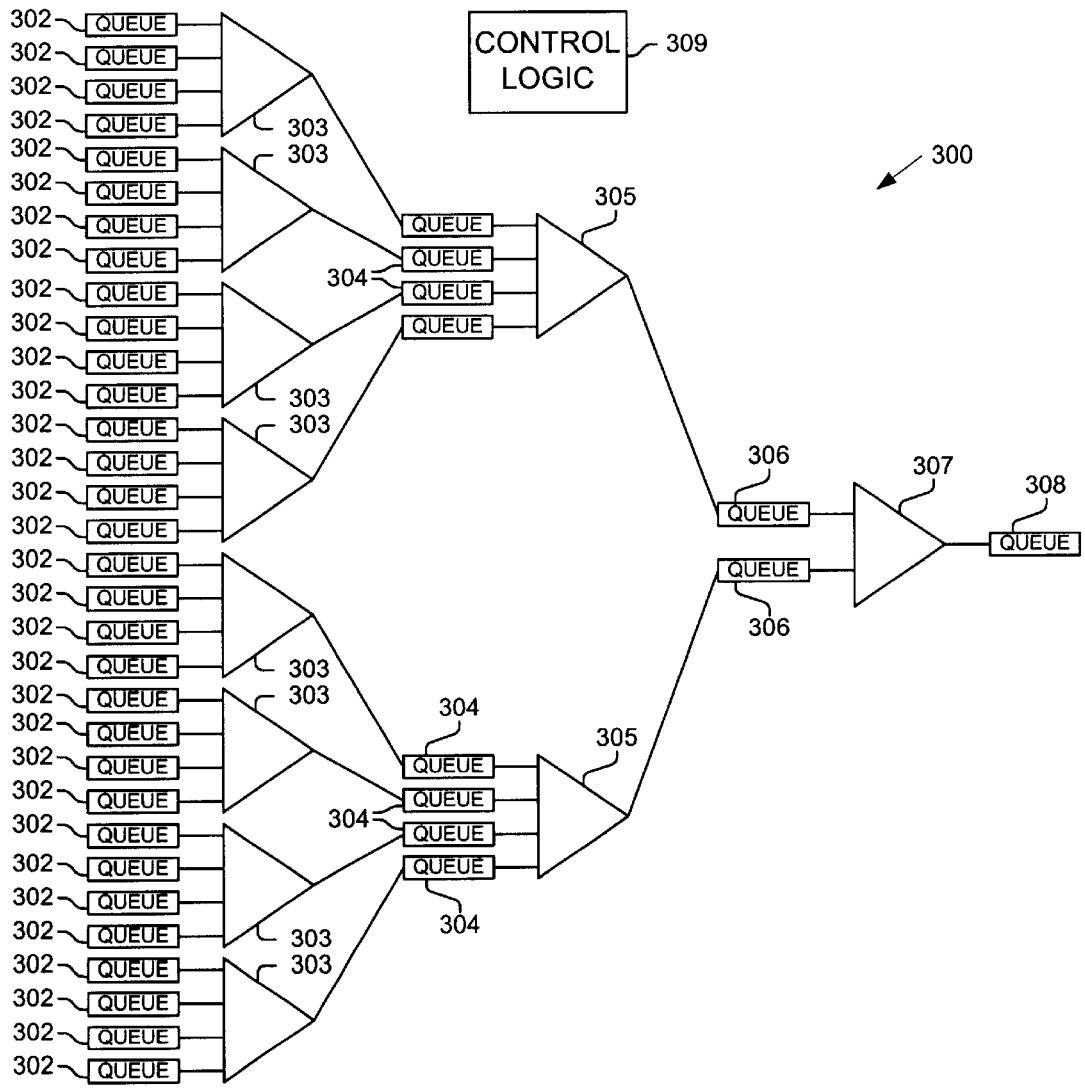
FIGS. 3A–B are block diagram illustrating embodiments for sorting streams of data items.

FIG. 3A illustrates a resequencer 300 for sorting streams of data items including packets within a packet switching system. A single data item or streams of ordered data items reside in input queues 302 and are sorted into a single output queue 308 through three stages of comparators 303, 305 and 307 and queues 304 and 306. Control logic 309 controls the operation of the other items (control line connections to these items not shown for simplicity). For example, control logic 309 could be a state table and clock-based counter with certain control lines being activated and deactivated at predetermined times or states. Additionally, if resequencer 300 sorts multiple sets of data streams, control logic 309 could be used to coordinate the loading, flushing, and sorting of the sets of streams of data items.

Figure 3B:
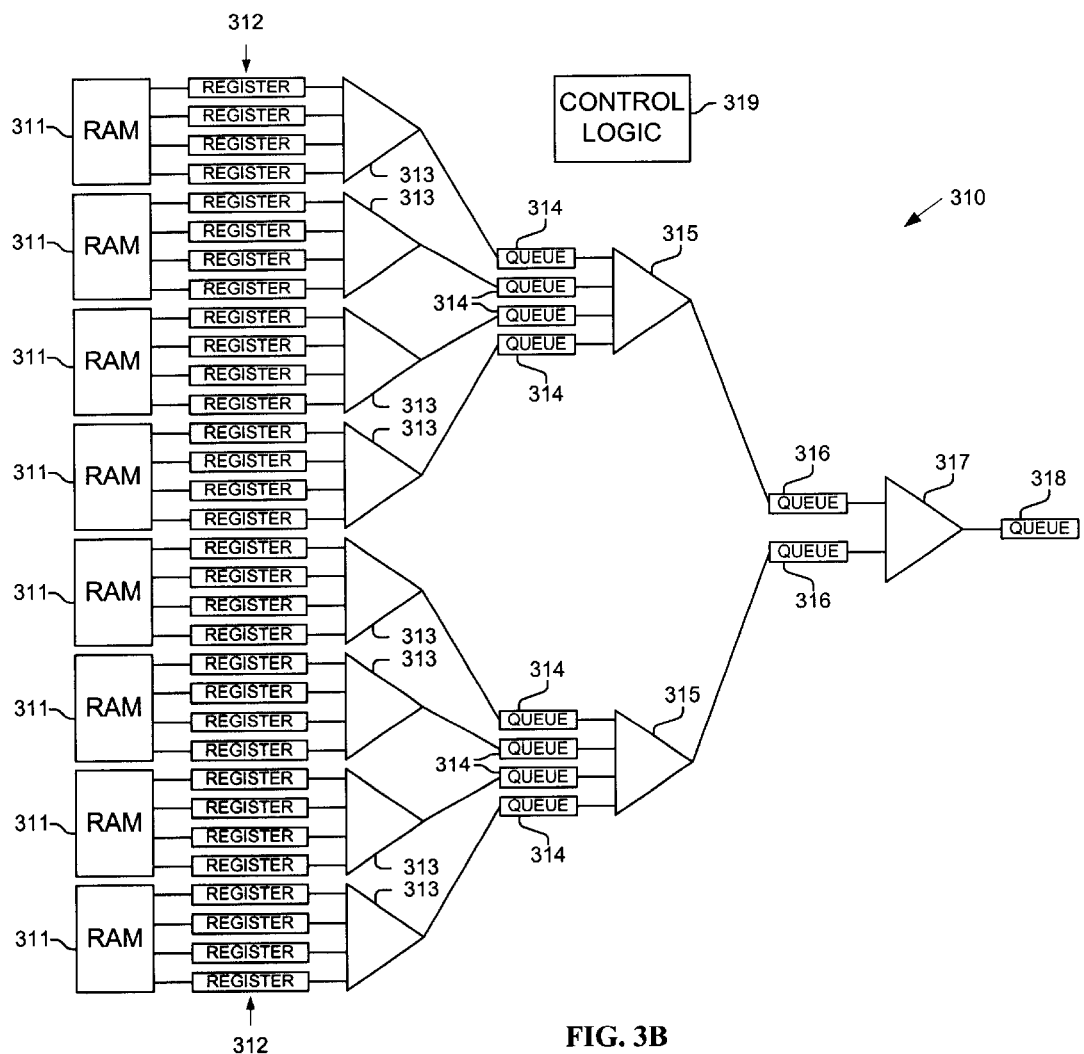

FIG. 3B illustrates another embodiment for sorting one or more sets of ordered streams of data items. Resequencer 310 sorts one or more streams of data stored in the RAMs 311. In one embodiment, control logic 319 controls the operation of resequencer 310 and its elements (control line connections to these elements not shown for simplicity). For example, control logic 319 could be a state table and clock-based counter where certain control lines are activated and deactivated at predetermined times or states. Data items from each of the ordered streams are loaded from RAMs 311 into a respective register (or queue) 312, with typically one register corresponding to a single stream of data items. Comparators 313 continuously determine the first value in the sequence for the data items in its input registers 313 and forward it to its respective output queue 314. The second stage of comparators 315 continuously determine the first value in the sequence for the data items in its input queues 314 and forward it to its respective output queue 316. Comparator 317 continuously determines the first value in the sequence for the data items in its input queues 316 and forward it to output queue 318. Another component or system (not shown) removes the data items from output queue 318 which are in a single ordered stream of data items. Note, that the data items produced by each of the comparators 313, 315, 317 are in a single ordered stream for their respective input streams of data items.

Additionally, resequencer 310 can be used in a multiplexed fashion to order multiple sets of streams of ordered data items. In one embodiment, control logic 319 loads a first set of streams of data items from RAMs 311 into registers 312 for some predetermined or dynamic time period resulting in a single stream of data items being placed in queue 318. After this predetermined or dynamic time period, control logic 319 loads a second set of streams of data items from RAMs 311 into registers 312 for some predetermined or dynamic time period resulting in a single stream of data items being placed in queue 318. This process is repeated for each of the sets of ordered data items.

Resequencer 310 as shown in FIG. 3B and resequencer 300 as shown in FIG. 3A each orders up to thirty-two streams of data items (e.g., one for each register 312 or queue 302). However, the invention is not so limited. The invention is extensible to accommodate more or less streams of data items by adding or removing elements and sorting stages. Similarly, other embodiments use comparators having a different number of inputs, and more or less RAMs 311. Additionally, the number of elements accommodated by registers (or queues) 312 and queues 314, 316 and 318 can be one or more (or even zero if the embodiment does not require latched data or the like). This sizing is typically determined by the needs of the application using resequencer 300 or 310, and possibly on the technology used to implement an embodiment of the invention.

Figure 4A:
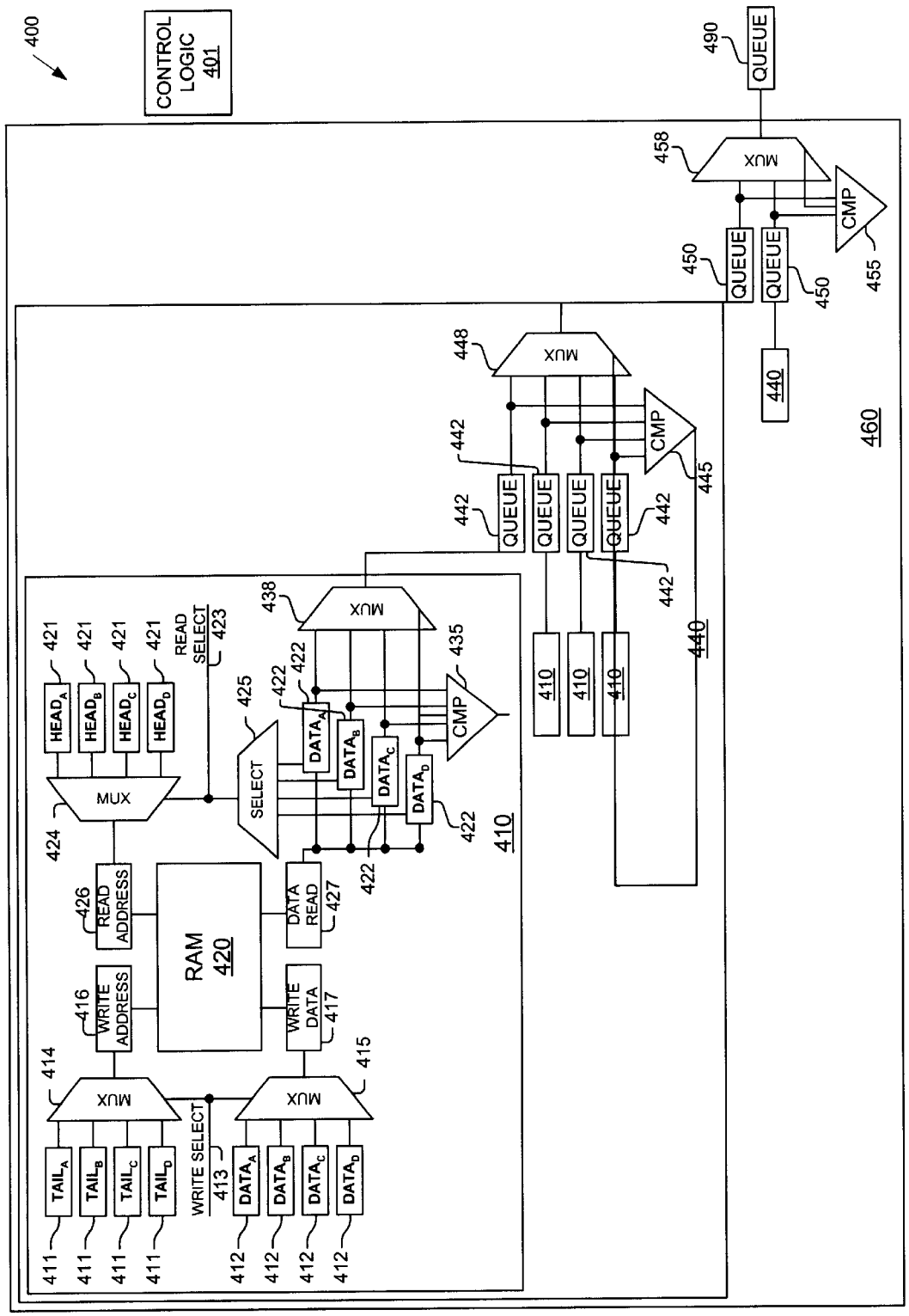
FIGS. 4A–B are block circuit diagrams of embodiments for resequencing streams of data items.

FIG. 4A illustrates one embodiment 400 of resequencer 310 shown in FIG. 3B. Control logic 401 controls the operation of the elements of resequencer 400 by maintaining a state table and counter which sets and resets control lines to its elements (control lines not shown for simplicity). Resequencer 400 comprises three sorting stages which produce a single stream of data items into resequencer output queue 490. For simplicity, only the components of a single element at each stage are shown in detail.

Turning to the detailed illustration of element 410, shown is RAM 420 which stores four streams for each of the one or more sets of ordered streams of data items to be sorted by resequencer 400. RAM 420 stores each of these streams, referred to as A, B, C, and D, in a ring buffer or (other data structure). Head and tail pointers for each of the four ring buffers are stored in tail pointers 411 and head pointers 421. Loading of RAM 420 is controlled by control logic 401 which sets writes select 413 at appropriate times to select using multiplexers 414 and 415 a corresponding write address and write data items 412, and places them respectively in the write address register 416 and write data register 417 for RAM 420. The data item in write data register 417 is then stored in RAM 420 at the address indicated by the value of write address register 416.

Individual data items for each of the four streams of data items are removed from RAM 420 and loaded in a respective register 422. Control logic 401 sets read select 423 to select using multiplexer 424 a corresponding read address from one of the head pointers 421 which is placed in read address register 426. Data is read from RAM 420 at an appropriate time and placed in data read register 427, which is latched into the appropriate data register 422 using selector 425.

Data items stored in data registers 422 are evaluated by comparator 435 to determine the first one in the sequence (typically the one with the lowest value). When two or more data items have the same value, the comparator selects one of the values based on some method such as the first one in the order A, B, C, then D, or using a round robin or other technique to vary this selection. Based on the output of comparator 435, multiplexer 438 configures a path between the appropriate data register 422 and corresponding queue 442, which the data item stored in the electrically connected data register 422 is then latched into the queue 442. A data item is then retrieved from RAM 420 to replace the data item taken from the selected data register 422.

Each of the second ordering stages of resequencer 400 then evaluates the data items at the head of its input queues 442 (sorted by its respective components 410) to determine the first data item in the sequence. Based on the output of comparator 445, multiplexer 448 configures a path between the appropriate queue 442 and corresponding queue 450, which the data item stored in the electrically connected queue 442 is then latched into the queue 450.

Similarly, the third ordering stage of resequencer 400 then evaluates the data items at the head of its input queues 450 (sorted by its respective components 440) to determine the first data item in the sequence. Based on the output of comparator 455, multiplexer 458 configures a path between the appropriate queue 450 and corresponding output queue 490, which the data item stored in the electrically connected queue 450 is then latched into the queue 490. In this manner, a single ordered stream of data items is produced from resequencer 400 based on the thirty-two input streams of ordered data items.

Resequencer 400 can also be used to order multiple sets of streams of data items. In this case, a first set of data items is read from RAM 420 and processed for either a predetermined or dynamic time period. Then, a next set of data items is read from RAM 420 and processed for either a predetermined or dynamic time period, and so on. Control logic 401 causes data items from the previous set of streams to be flushed (i.e., removed) from the first, second, and third sorting stages in a coordinated fashion so the data items from a previous set can continue to propagate through the later sorting stages, while the earliest sorting stages are ordering a second set of data items. In this manner, a single resequencer 400 can be used to order multiple sets of ordered streams of data items into multiple order streams of data items.

Figure 4B:
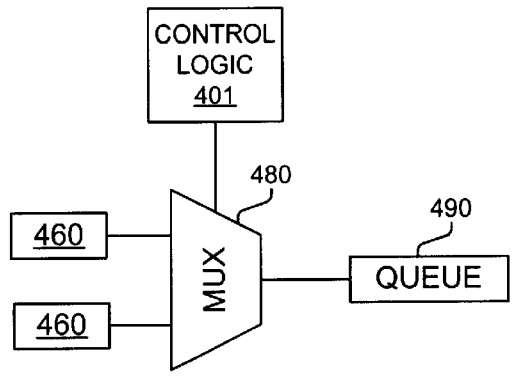

Additionally, resequencer 400 can be extended to use two-components 460 to operate in parallel as shown in FIG. 4B. Control logic 401 selects via multiplexer 480 which stream of data items from the components 460 is placed in output queue 490. In this manner, each component 460 will only need to order a portion (e.g., half) of the sets of streams of data items. And, by staggering the operation of each component 460, each component 460 would need to produce a stream of sorted data items at a lower rate (e.g., half).

Figure 5:
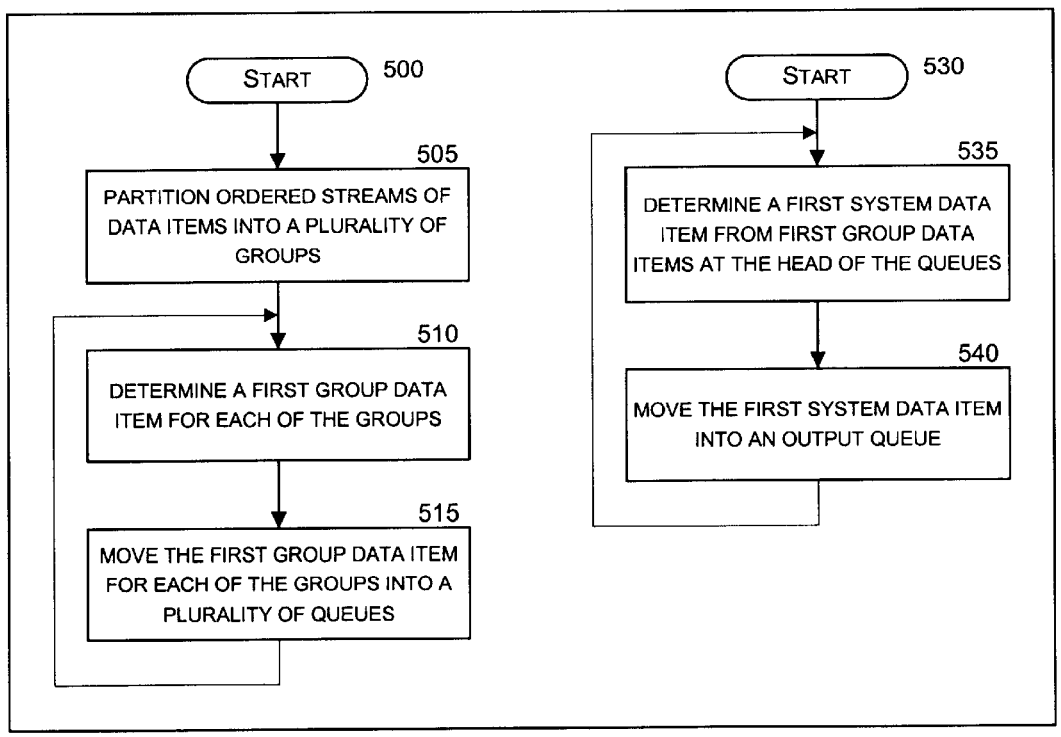
FIGS. 5–6 are high-level flow diagrams illustrating steps performed in one embodiment for resequencing streams of data items.

FIG. 5 illustrates an embodiment of a resequencer for sorting streams of data items into a single stream. Note, steps 500–515 and 530–540 operate in a pipeline fashion in parallel as two successive ordering or sorting stages of a resequencer.

Processing of the first of the two stages described in FIG. 5 begins at step 500, and proceeds to step 505, where the streams of data items are partitioned in to multiple groups (e.g., four groups of four streams). Next, in step 510, a first group data item is determined for each of the groups. Then, in step 515, the first group data item for each of the groups is moved into its respective data structure representing a queue, and processing returns to step 510.

Processing of the second stage begins at step 530, and proceeds to step 535, where a first system data item in sequence is determined from the first group data items at the head of their respective queues. Next, in step 540, this first system data item is moved to the output queue, and processing returns to step 535.

Figure 6:
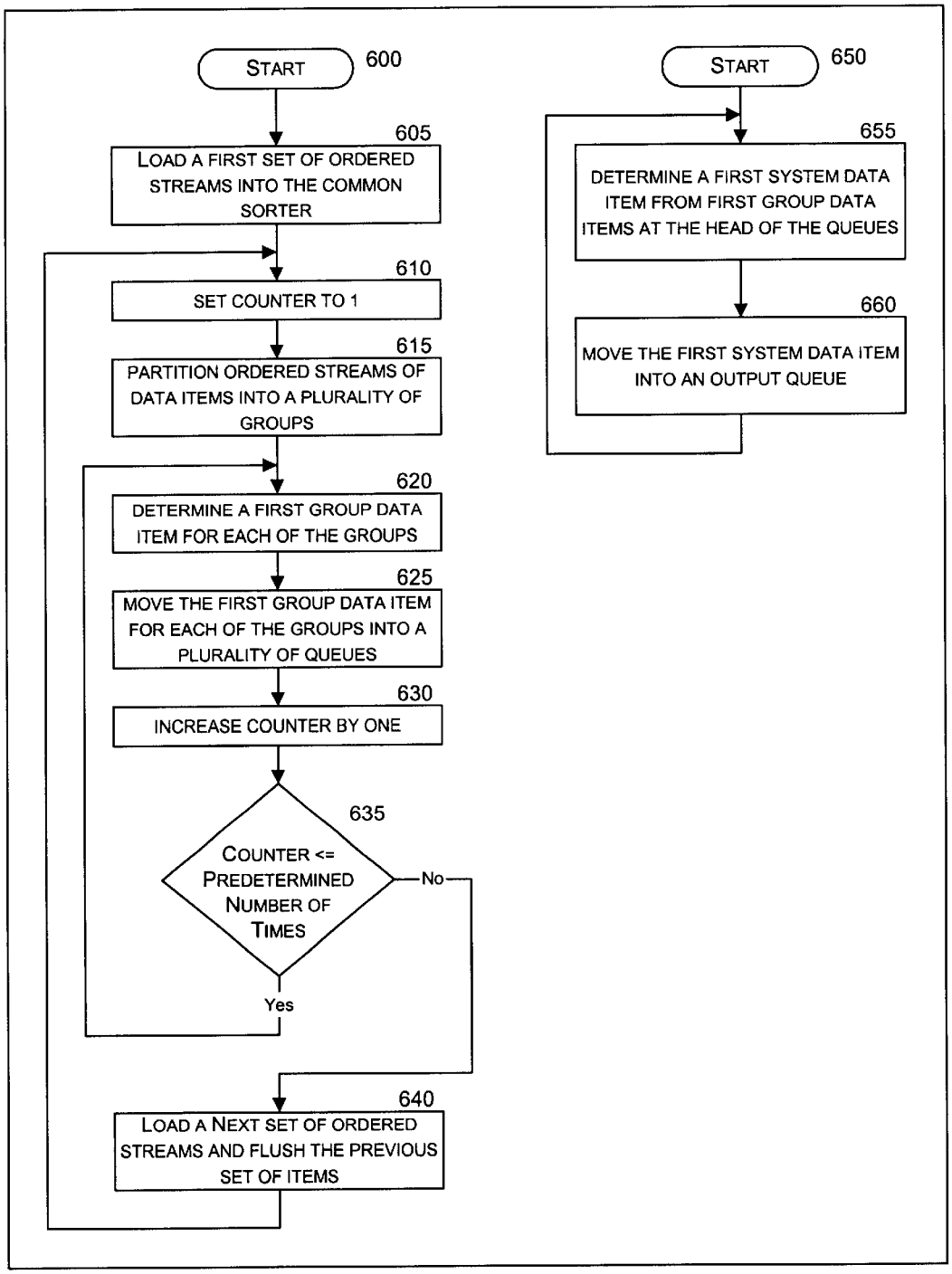

FIG. 6 illustrates an embodiment of a resequencer for sorting multiple sets of ordered streams of data items into multiple ordered streams of data items. Note, steps 600–640 and 650–660 operate in a pipeline fashion in parallel as two successive ordering or sorting stages of a resequencer.

Processing of the first of the two stages described in FIG. 6 begins at step 600, and proceeds to step 605, where a first set of ordered streams are loaded into the resequencer. Next, in step 610 a counter is set to one. In step 615, the streams of data items are partitioned in to multiple groups (e.g., four groups of four streams). Next, in step 620, a first group data item is determined for each of the groups; and, in step 625, the first group data item for each of the groups is moved into its respective data structure representing a queue. The counter is then increased by one in step 630. If the counter is less than or equal to a predetermined number of times (e.g., the resequencer will produce a predetermined number of times of ordered data items for each of the sets of stream) as determined in step 635, then processing returns to step 620 to continue processing the current set of streams of data items. Otherwise, in step 640, a next set of ordered streams of data items is loaded into the sorter and the data items from the previous set are flushed from this ordering stage. Then, processing returns to step 610 to order the current set of streams of data items.

Processing of the second stage begins at step 650, and proceeds to step 655, where a first system data item in sequence is determined from the first group data items at the head of their respective queues. Next, in step 660, this first system data item is moved to the output queue, and processing returns to step 655.

Figure 7A:
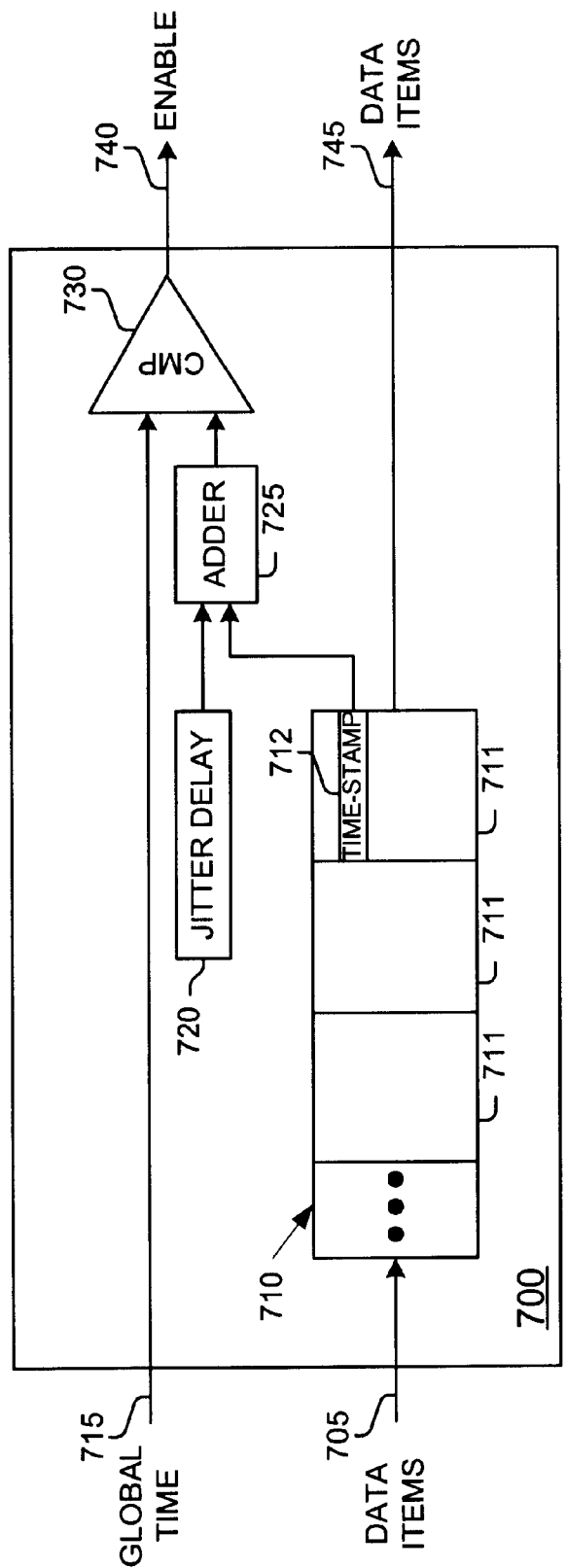
FIGS. 7A–B are block circuit diagrams of embodiments of jitter buffers for reducing the packet burstiness within a packet switch.
Figure 7B:
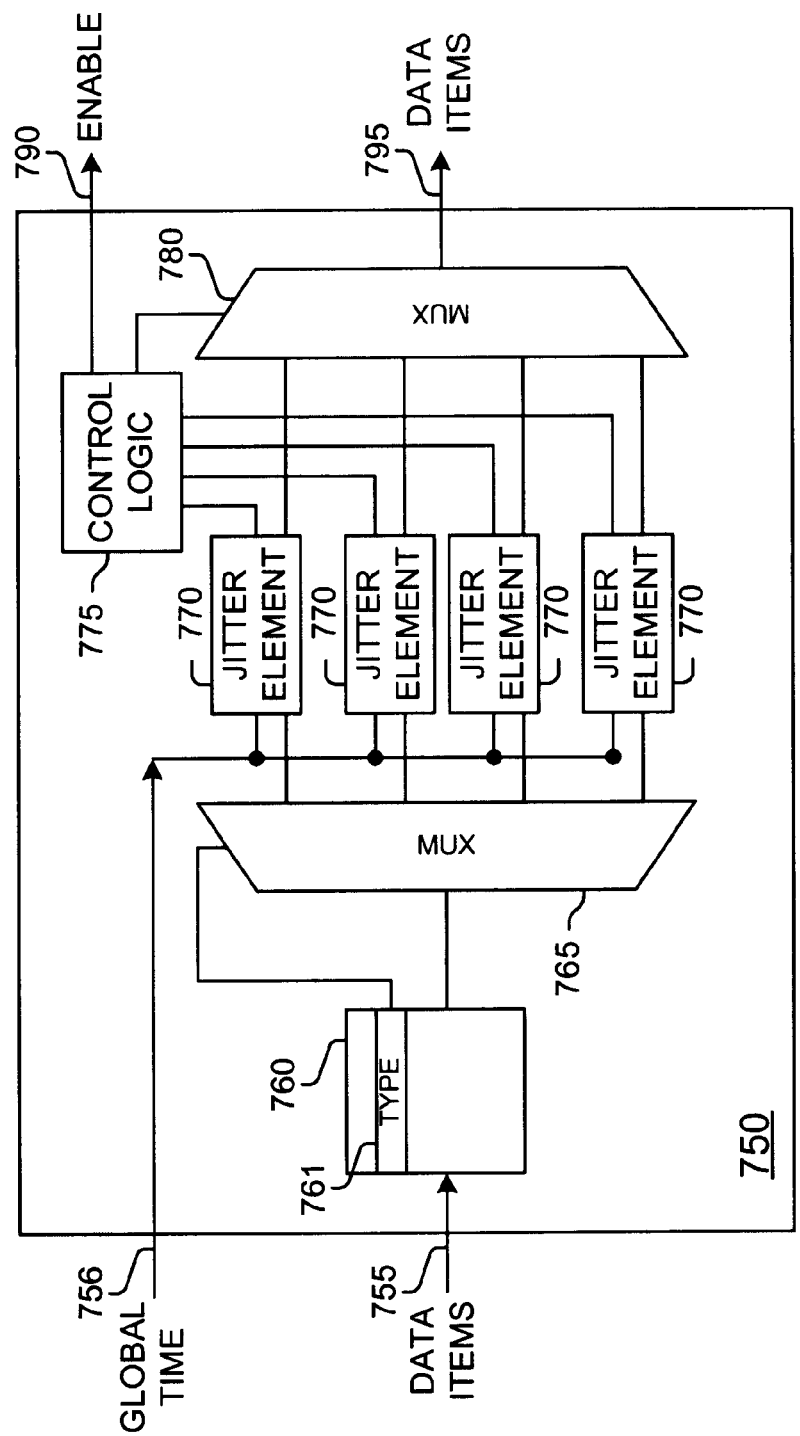

FIGS. 7A–B illustrate two of many embodiments of a jitter buffer. Jitter buffers can be used within packet switches to reduce traffic burstiness by requiring that each packet passing through the jitter buffer be of a predetermined age before it is allowed to pass. By placing jitter buffers at various distributed locations within a packet switch, the packet burstiness within the packet switch is reduced. For example, if a jitter buffer is placed at each of three switching stages of a packet switch (e.g., one of the packet switches illustrated in FIGS. 2A–C) with increasing predetermined jitter delay values at each stage (e.g., 30, 60, 90 microseconds or packet times), packets will be held at each jitter buffer until their time-stamp value plus the predetermined jitter delay value for that stage equals or exceeds the current global time of the packet switch. These predetermined jitter delay values can be static or dynamic (e.g., adjusted based on measured traffic), and can vary for each class, type or priority of traffic at each jitter buffer. For example, high priority traffic might bypass the jitter buffer (or have a predetermined jitter delay of zero or some small number so it never is delayed), while other priorities of traffic might be subjected to jitter delays of other predetermined jitter delay values.

FIG. 7A, to which we now turn, illustrates one embodiment of a jitter buffer (or an element of another jitter buffer such as that illustrated in FIG. 7B). Jitter buffer 700 illustrates an embodiment for use in a packet switch where packets (or data items representing packets) have a time-stamp value associated with them. Typically, this time-stamp value corresponds with the time the packet entered the packet switch, and was placed in the packet by a line card or input interface. The data items (or packets) 705 arrive in a queue 710, which typically is sized to match the performance of the switch and to hold multiple data items 711. A system global time 715 is provided to jitter buffer 700 (or the jitter buffer could maintain this time). Global time 715 is typically related to or synchronized with the clock or counter used to produce a time-stamp 712 of a packet 711. The predetermined jitter delay is added by adder 725 to the value of time-stamp 712 of the first data item 711 in the queue 710, and when the global time 715 exceeds this summation as determined by comparator 730, enable line 740 is set and the first data item 711 in the queue 710 is allowed to pass as indicated by data items 745. Another embodiment of Jitter buffer 700 sets enable line 740 when the global time 715 exceeds this summation as determined by comparator 730.

Jitter buffer 700 is only one of numerous possible embodiments of a jitter buffer. A few of many different variations and embodiments include, for example: if data items 705 did not arrive with increasing values of time-stamps 712, then a different data structure could be used in place of queue 710; the jitter delay 720 could be subtracted from global time 715 and compared to the time-stamp 712; or data items 745 could be forwarded from jitter buffer 700 without the use of the enable 740 handshaking mechanism. In one embodiment, a data item includes a time-stamp and a pointer to the actual data corresponding to the data item, with the actual data being stored in a memory or buffer.

FIG. 7B illustrates another embodiment of a jitter buffer 750 which provides multiple jitter buffer elements 770 for handling different priorities, types, or classes of services. One of numerous embodiments of a jitter buffer element 770 is jitter buffer 700 of FIG. 7A. Jitter buffer 700 (FIG. 7A) provided only one queue for handling traffic, while jitter buffer 750 provides four queues for handling various types of traffic.

As data items 755 arrive at jitter buffer 750, each data item 760 is routed via multiplexer 765 to one of the jitter elements 770 based on the type 761 of the data item 760. Global time 756 is provided to each of the jitter elements 770. As data items are allowed to pass by one or more of the jitter elements 770, control logic 775 provides an enable signal 790 to component or system receiving data items 795, and controls multiplexer 780 to provide the correct data item from the appropriate jitter element 770. In this manner, the four types of traffic could have different predetermined jitter delays, and data items of a higher priority type are not delayed by data items having a lower priority type. The embodiment illustrated in FIG. 7B is just another of numerous embodiments of a jitter buffer.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A packet switch element of a packet switch comprising:
   a resequencer to resequence a plurality of sets of streams of packets received from one or more interconnection networks of the packet switch, the resequencer including:
      a plurality of buffers for storing the plurality of sets of streams of packets;
      a plurality of input queues to receive packets from an input set of streams of packets from the plurality of buffers, the input queues aggregated into a plurality of input groups;
      control logic to control packets of which one of the plurality of sets of streams of packets are currently received by the plurality of input queues, and to context switch to a next set of the plurality of sets of streams of packets every predetermined duration;
      a plurality of group comparators, each of the plurality of group comparators coupled to the input queues within one of the plurality of input groups to determine a first group packet from packets at the head of its respective one of the plurality of input groups;
      a plurality of group output queues, each of the plurality of group output queues coupled to one of the plurality of group comparators and one of the plurality of input groups to receive one of the first group packets; and
      an output comparator coupled to the plurality of group output queues to determine a first output packet from packets at the head of the plurality of output queues.

2. The packet switch element of claim 1, wherein said context switching to a next set of the plurality of sets of steams of packets includes flushing packets from the plurality of input queues; and wherein said flushed packets are added to the plurality of input queues in response to a next context switch to the corresponding one of the plurality sets of streams of packets.

3. The packet switch element of claim 2, wherein a particular packet is removed from one of the plurality of buffers in response to the particular packet being determined as the first output packet.

4. The packet switch element of claim 1, wherein each particular set of the plurality of sets of streams of packets corresponds to a different priority or class of service than all other sets of the plurality of sets of streams of packets.

5. A method performed by a mechanism for identifying a plurality of sequences of data items, the method comprising:
   identifying a designated set of a plurality of sets of input streams of data items;
   determining a first winning data item from said data items in a first non-overlapping plurality of streams of data items of the designated set of the plurality of sets of input streams of data items, the first winning data item being first in a predetermined ordering evaluation scheme;
   determining a second winning data item from said data items in a second non-overlapping plurality of streams of data items of the designated set of the plurality of sets of input streams of data items, the second winning data item being first in the predetermined ordering evaluation scheme;
   determining a third winning data item from a set of winning data items, the set of winning data items including the first and second winning data items;
   wherein after a predetermined duration of processing the designated set, flushing data items corresponding to the designated set currently in the mechanism and identifying a new set of the plurality of sets of input streams of data items as the designated set.

6. The method of claim 5, comprising determining a fourth winning data item from a second set of winning data items, the second set of winning data items including the third wining data items.

7. The method of claim 5, wherein the duration corresponds to an occurrence of a predetermined event, number of cycles, or sorted data items generated by the mechanism.

8. The method of claim 7, wherein all data items in the set of ordered streams of data items correspond to a different priority or class of service than all data items in the next set of ordered streams of data items.

9. The method of claim 5, wherein all data items in the set of ordered streams of data items correspond to a different priority or class of service than all data items in the next set of ordered streams of data items.

10. The method of claim 5, wherein said flushed data items corresponding to the designated set are re-identified as part of the designated set after processing the new set of the plurality of sets of input streams of data items.

11. An apparatus for identifying a plurality of sequences of data items, the apparatus comprising:
   one or more memories for storing data items of a plurality of sets of input streams of data items;
   a first plurality of registers configured to receive from said one or more memories first data items from a designated set of the plurality of sets of input streams of data items, said each first data item being a first in sequence for its corresponding input stream of data items,
   a first mechanism configured to evaluate a first winning data item from said data items stored in the first plurality of registers, the first winning data item being first in a predetermined ordering evaluation scheme;
   first queue configured to receive the first winning data item;
   a second plurality of registers configured to receive from said one or more memories second data items from the designated set of the plurality of sets of input streams of data items, said each second data item being a first in sequence for its corresponding input stream of data items,
   a second mechanism configured to evaluate a second winning data item from said data items stored in the second plurality of registers, the second winning data item being first in the predetermined ordering evaluation scheme;
   a second queue configured to receive the second winning data item; and
   a third mechanism configured to identify a third winning data item from a set of winning data items, the set of winning data items including data items at the head of the first and second queues;
   wherein after a predetermined duration of processing the designated set, identifying a new set of the plurality of sets of input streams of data items as the designated set and flushing data items currently in first and second queues.

12. The apparatus of claim 11, comprising:
a third queue configured to receive the third winning data item; and
a fourth mechanism configured to identify a fourth winning data item from a second set of winning data items, the second set of winning data items including data items at the head of the third queue.

13. The apparatus of claim 11, wherein the duration corresponds to an occurrence of a predetermined event, number of cycles, or sorted data items generated.

14. The apparatus of claim 11, wherein each of said input streams of data items correspond to data items received from different paths through a packet switch.

15. The apparatus of claim 14, wherein each set of the plurality of sets of input streams of data items corresponds to a different priority or class of service.

16. The apparatus of claim 11, wherein each of said data items flushed from the first and second queues remain in said one or more memories until after being identified in a subsequent processing cycle as the third winning data item.

17. The apparatus of claim 1, wherein in response to said identifying the new set of the plurality of sets of input streams of data items, at least one data item previously from the first queue or the second queue is placed in one of the first or second pluralities of registers.

18. The apparatus of claim 11, wherein a particular data item is removed from said one or more memories in response to the particular data item being determined as the third winning data item.

* * * * *

UNITED STATES PATENT AND TRADEMARK OFFICE
CERTIFICATE OF CORRECTION

PATENT NO. : 6,757,284 B1
DATED : June 29, 2004
INVENTOR(S) : Galles

It is certified that error appears in the above-identified patent and that said Letters Patent is hereby corrected as shown below:

Column 2,
Line 56, replace "environments," with -- environments; --.

Column 5,
Line 53, replace "within a packet switch 260." with -- within packet switch 260 --.

Column 6,
Line 41, replace "devices," with -- devices; --.
Line 52, replace "arc" with -- are --.

Column 8,
Line 63, replace "two-components" with -- two components --.

Column 12,
Line 43, replace "first queue" with -- a first queue --.

Column 14,
Line 5, replace "of claim 1" with -- of claim 11 --.

Signed and Sealed this

Twenty-fifth Day of October, 2005

JON W. DUDAS
*Director of the United States Patent and Trademark Office*